(12) United States Patent
Qiu et al.

(10) Patent No.: US 11,706,222 B1
(45) Date of Patent: Jul. 18, 2023

(54) SYSTEMS AND METHODS FOR FACILITATING MALICIOUS SITE DETECTION

(71) Applicant: Trend Micro Incorporated, Tokyo (JP)

(72) Inventors: Peng Qiu, Nanjing (CN); Zeyi Huangfu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 64 days.

(21) Appl. No.: 17/510,905

(22) Filed: Oct. 26, 2021

Related U.S. Application Data

(63) Continuation of application No. 11/952,917, filed on Dec. 7, 2007, now abandoned.

(51) Int. Cl.
*H04L 9/40* (2022.01)

(52) U.S. Cl.
CPC ........ *H04L 63/101* (2013.01); *H04L 63/0209* (2013.01); *H04L 63/145* (2013.01)

(58) Field of Classification Search
CPC .. H04L 63/101; H04L 63/0209; H04L 63/145
USPC .......................................................... 726/22
See application file for complete search history.

(56) References Cited

U.S. PATENT DOCUMENTS

| | | | |
|---|---|---|---|
| 8,001,268 B2* | 8/2011 | Lund | H04L 67/63 709/224 |
| 2006/0095404 A1* | 5/2006 | Adelman | G06F 16/9535 |
| 2006/0253458 A1* | 11/2006 | Dixon | H04L 63/1483 |
| 2008/0082662 A1* | 4/2008 | Dandliker | H04L 63/10 709/225 |
| 2008/0256619 A1* | 10/2008 | Neystadt | G06F 21/577 726/5 |

* cited by examiner

Primary Examiner — Jacob Lipman
(74) Attorney, Agent, or Firm — Beyer Law Group LLP

(57) ABSTRACT

A system for facilitating Internet security for devices on a local area network (LAN) is disclosed. The LAN may connect to a rating server through the Internet and may including at least an anti-malware application for detecting malware. The system may include a black list for being implemented on the LAN for storing identifiers of a set of forbidden sites. The devices may be prevented from accessing content provided by each of the forbidden sites. The system may also include a profiler for being implemented on the LAN for updating the black list utilizing a set of result data. The data may include scan result data and rating result data. The scan result data may pertain to results of scans performed by the anti-malware application; the rating result data may pertain to results of rating performed by the rating server.

12 Claims, 3 Drawing Sheets

SYSTEMS AND METHODS FOR FACILITATING MALICIOUS SITE DETECTION

BACKGROUND OF THE INVENTION

The proliferation of mal ware transmitted through the Internet has necessitated individuals and organizations to adopt protection techniques and systems. In general, individuals and organizations may employ services, software, and/or hardware for identifying malicious Internet sites (e.g., websites and FTP sites) that may distribute malware. Individuals and organizations may also utilize software and/or hardware to detect malware data/files provided by various sites. Typically, uniform resource locator (URL) rating services and anti-malware applications may be utilized, as discussed with reference to the example of FIG. 1.

FIG. 1 illustrates a schematic block diagram of an example prior art arrangement for malicious web/FTP site and malware detection. The arrangement may include a gateway 106 disposed between a set of devices (e.g., client devices), such as devices 102a, 102b, and 102c, and the Internet 108. Gateway 106 may be connected to the devices through a local area network 104 (LAN 104). Gateway 106 may also be connected to a URL rating server 110 through Internet 108.

Typically, when the user of a device, e.g., device 102a, wishes to access content of a web/FTP server 112, device 102a may send a HTTP/FTP request to gateway 106. In response to the HTTP/FTP request, gateway 106 may send a request to URL rating server 110 to inquire the reputation (or rating) of web/FTP server 112. In response, URL rating server may provide a rating result to gateway 106. If the rating result indicates that web/FTP server 112 is safe, gateway 106 may send the HTTP/FTP request to web/FTP server 112 for requesting data/content. In response, web/FTP server 112 may provide a HTTP/FTP response, which may contain data, to gateway 106.

Gateway 106 may include an anti-malware application 116 configured to scan the data in the HTTP/FTP response for determining whether the HTTP/FTP response contains malware, or malicious code. If any malicious code is detected, anti-malware application 116 may delete or quarantine the data, and gateway 106 may send a message to device 102a to inform the user that the access to web/FTP server 112 has been blocked. If no malicious code is detected, gateway 106 may forward the HTTP/FTP response to device 102a.

The prior art arrangement may have several disadvantages. For example, URL rating server 110 may need to process a tremendous amount of rating requests related to HTTP/FTP requests made by a great amount of devices. Accordingly, substantially high hardware and/or software costs may be incurred in order to maintain a desirable performance level of URL rating server 110.

In addition to hardware and software capability and capacity, the performance of URL rating server 110 may also depend on data samples available to the operator of URL rating server 110 (or the rating service provider). However, the operator may not have sufficient data samples for rating certain sites. For example, there may be more data samples for web/FTP sites in a more widely-used language, such as English, than for web/FTP sites a relatively less used language, such as Korean. There may not be enough data samples for the operator to rate sites with relatively low global utilization, though these sites may have high (and concentrated) local utilization/demand. As a result, there may be many sites for which URL rating server 110 is unable to provide rating results.

Given that many sites cannot be rated by URL rating server 110, anti-malware application 116 may be required to scan a tremendous amount of data provided by unrated sites as well as sites rated as safe. As a result, malware may not be timely detected, and/or substantially high hardware and/software costs may be incurred to ensure a desirable performance level fear anti-malware application 116.

SUMMARY OF INVENTION

An embodiment of the present invention relates to a system for facilitating Internet security for devices on a local area network (LAN). The LAN may connect to a rating server through the Internet and may including at least an anti-malware application for detecting malware. The system may include a black list for being implemented on the LAN for storing identifiers of a set of forbidden sites. The devices may be prevented from accessing content provided by each of the forbidden sites. The system may also include a profiler for being implemented on the LAN for updating the black list utilizing a set of result data. The data may include scan result data and rating result data. The scan result data may pertain to results of scans performed by the anti-malware application; the rating result data may pertain to results of rating performed by the rating server.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of maniple, and not by way of limitation, in the figures of the accompanying drawings and in which like reference numerals refer to similar elements and in which.

DETAILED DESCRIPTION OF EMBODIMENTS

Figure 1:
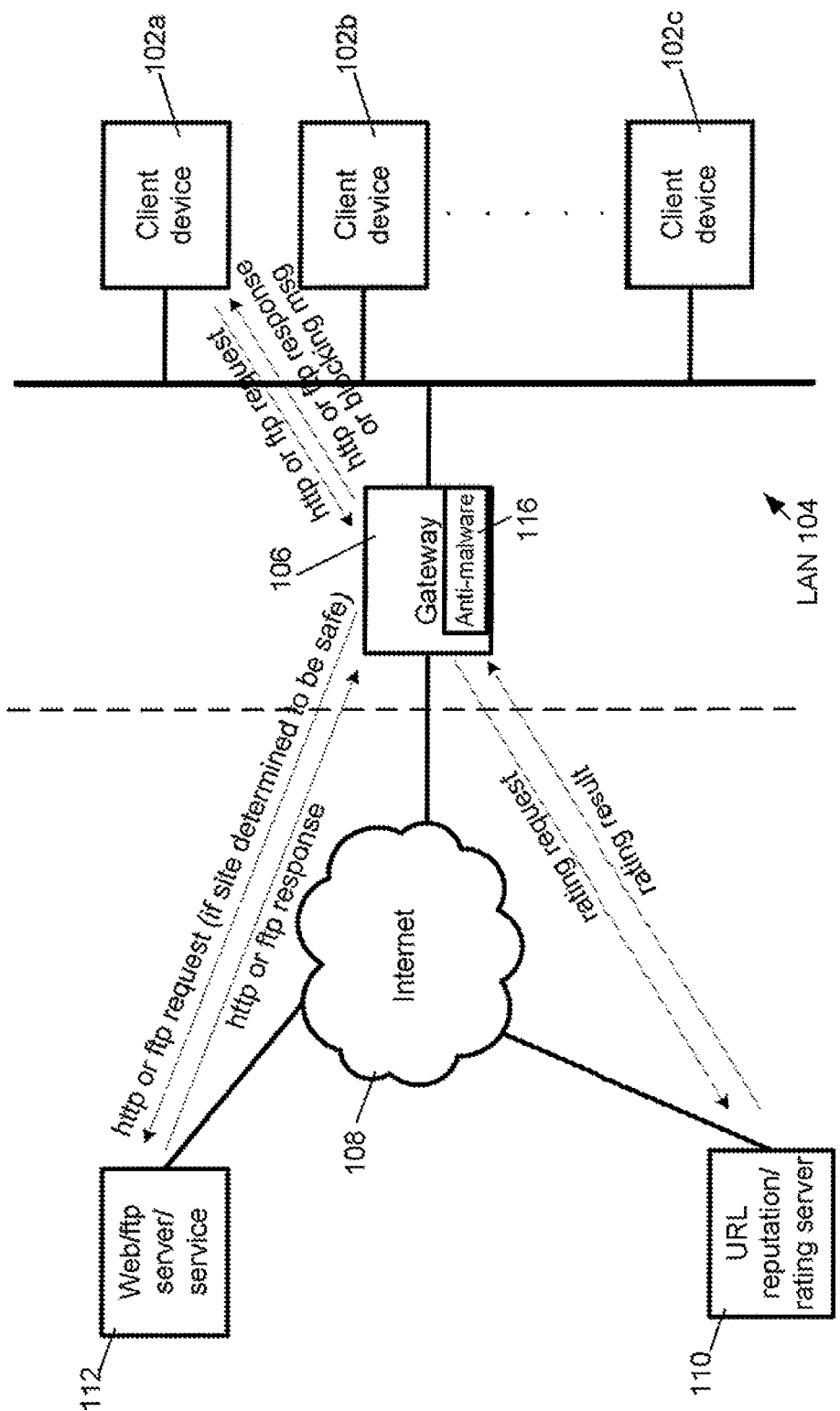
FIG. 1 illustrates a schematic block diagram of an example arrangement for malicious site detection.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without sonic or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the present invention relate to systems and methods for facilitating Internet security, which involves malicious site detection, for protecting devices (e.g., computing devices, communication devices, and/or entertainment devices) on one or more local area networks (LANs). Embodiments of the invention may take advantage of known rating and scanning results (or histories) pertaining to various web sites and FTP sites to create and update local malicious site black lists. Attempts for accessing sites already on the black lists may be blocked without rating requests being sent to the remote rating server through the Internet. Accordingly, potential access to malicious sites may be timely blocked. Further, the amount of data transmitted through the Internet may be reduced, and the amount of data processed by the rating server and the anti-malware application also may be reduced. Advantageously, costs for implementing the rating server and the anti-malware mechanism may be reduced, the responsiveness of the rating server and the anti-malware mechanism may be improved, and the efficiency and effectiveness of malicious site detection may be improved.

Some embodiments of the invention may also involve exchange and analyses of local black lists. With shared collective knowledge, the efficiency and effectiveness of malicious site detection may be further improved.

As an example, a system in accordance with one or more embodiments of the invention may include a local black list and a profiler. The local black list and the profiler may be implemented, for example, on a local area network (LAN).

The local black list may contain identifiers of a set of forbidden sites. The identifiers may be, for example, Uniform Resource Locators (URLs) and/or Internet Protocol (IP) addresses. Utilizing the local black list, the gateway of the LAN may block devices on the LAN from accessing content provided by each site in the set of forbidden sites, without sending rating requests to the rating server. As a result, the burden on the rating server may be substantially reduced. The gateway may also block the devices from accessing any subsite of any site in the set of forbidden sites, without sending out rating requests. Accordingly, security protection for the devices may be fortified.

The profiler may update the local black list utilizing a set of result data and a set of rules. The set of result data may include data pertaining to results of scans performed by one or more anti-malware and/or one or more rating servers, and therefore may represent a set of collective experience and knowledge. The set of rules may be provided by an administrator of the LAN who has knowledge about sites that have requested by local users; therefore, the set of rules may represent a set of local knowledge. Reinforced with up-to-date collective experience and local knowledge, the effectiveness local black list may be optimized.

The profiler may also request permission from the administrator of the LAN for providing the local black list to the rating service provider that operates the rating server. The local black list may be provided to the rating service provider if permitted. Accordingly, the rating service provider may utilize information in the local black list as additional data samples to improve the rating server. As a result, the performance of the rating server, and therefore the effectiveness of malicious site detection, may be improved.

The profiler may also receive analysis results from the rating service provider. The analyses may be performed utilizing local black lists provided by various profilers residing on various LANs. Accordingly, the profiler may utilize the analysis results to augment and/or improve the local black list. The profiler may also exchange local black list data with other profilers on other LANs and may improve the local black list utilizing data provided by other profilers. As a result, the efficiency and effectiveness of malicious site detection may be substantially improved.

The system may also include a local white list stored on the LAN. The local white list may contain identifiers of a set of allowed sites, or known safe sites. Requests made by the devices for accessing sites in the set of allowed sites or related subsites may be allowed without rating requests being sent to the rating server. Accordingly, the devices may access safe sites in a timely manner, and burden on the rating server may be reduced.

In one or more embodiments, the set of allowed sites may include allowed subsites of forbidden sites on the local black list, if the subsites are determined to be safe based on rating results, scanning results, an results, etc. Accordingly, access to the safe subsites may not be unnecessarily blocked.

The system may also include other local black lists and other profilers implemented on other LANs and having functions similar to functions of the above-discussed local black list and profiler. The profilers may be configured to exchange information based on data in the local black lists. Each profiler may also be configured to update and/or augment an associated local black list utilizing information provided by other profilers. As a result, the coverage and effectiveness of the local black lists may be substantially improved.

The features and advantages of the invention may be better understood with reference to the figures and discussions that follow.

Figure 2:
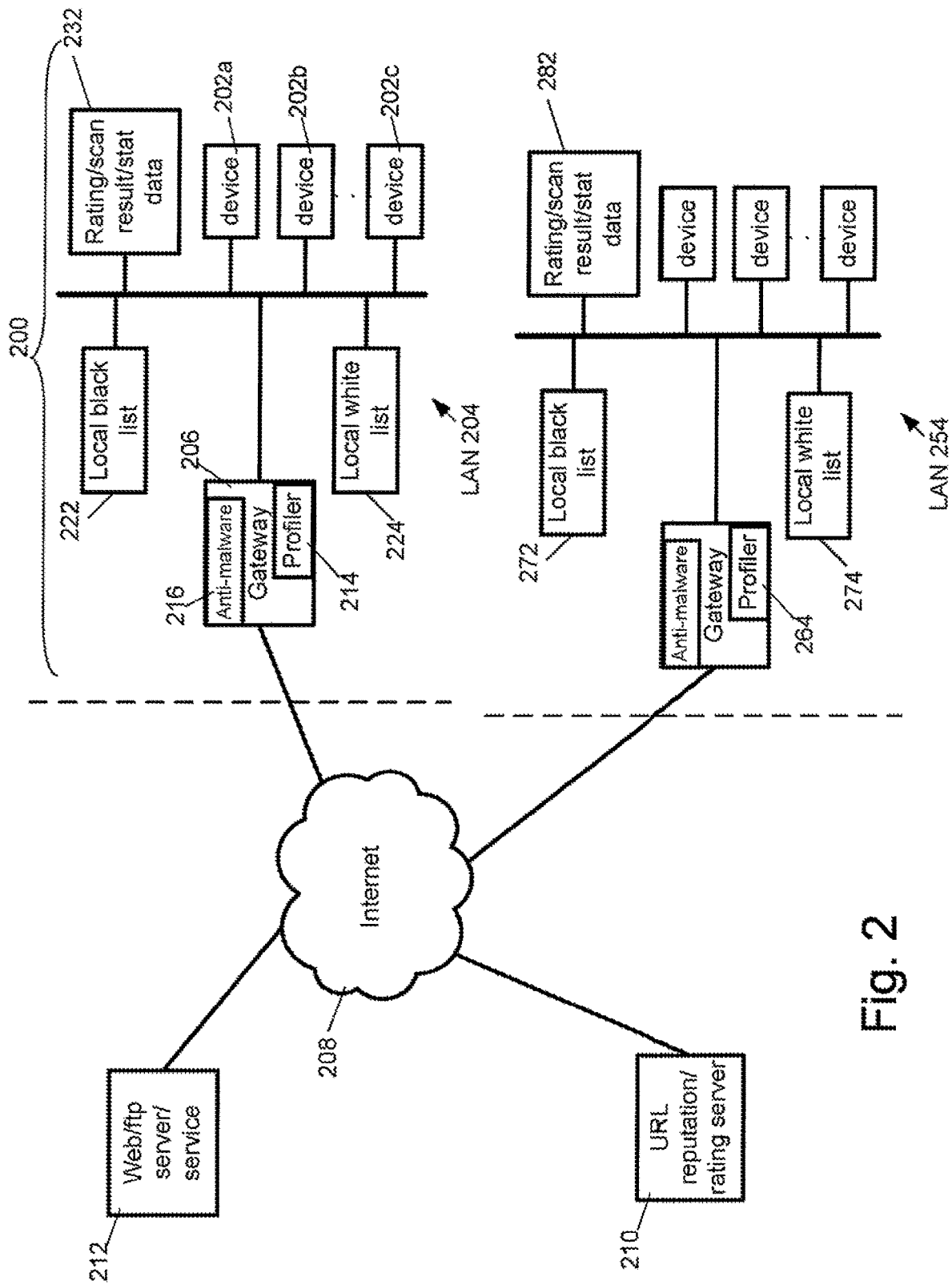
FIG. 2 illustrates a schematic block diagram of a system for facilitating malicious site detection in accordance with one or more embodiments of the present invention.

FIG. 2 illustrates a system 200 for facilitating malicious site (e.g. malicious web and/or FTP site) detection in accordance with one or more embodiments of the present invention. System 200 may include a local black list 222, a local white list 224, a set of rating/scan result/statistic data 232 (result data 232), and a profiler 214 implemented on a local area network 204 (LAN 204).

Local black list 222 may be configured to store identifiers of web/FTP sites that are determined and/or known to be malicious. The identifiers may represent URLs and/or IP addresses. In one or more embodiments, if a site is included in local black list 222, all associated subsites are deemed malicious. Accordingly, security may be ensured. As an illustrative example, a subsite of a site represented by a URL http://www.site.com/ may be represented by a URL having this format http://www.site.com/subsite. In one or more embodiments, local black list 222 may include particular subsites known to be malicious without including other subsites that are known to be safe. Accordingly, useful subsites may not be unnecessarily blocked.

Local white list 224 may be configured to store URLs of web/FTP sites that are determined and/or known to be safe.

The safe sites may include, for example, the websites of the enterprise that owns or operates LAN 204. Local white list 224 may be configured, for example, by the system administrator of LAN 204.

Result data 232 may include data pertaining to results of rating performed by a URL rating server 210 and scans performed by an anti-malware application 216 (or a gateway 206). The rating and scans may be performed in response to HTTP and/or FTP requests made by devices, e.g., devices 202a, 202b, and 202c, on LAN 204. Result data may represent collective experience and knowledge.

Profiler 214 may be configured to update local black list 222 based on result data 232 (representing collective experience) and rules defined by a system administrator for LAN 204 (representing local knowledge). Profiler 214 may also be configured to examine whether requested sites are in either of local black list 222 and local list 224, for expedited malicious site detection.

System 200 may also include a local black list 272, a local white list 274, a set of rating scan result/statistic data 282 (result data 282), and a profiler 264 implemented on another local area network 254 (LAN 254).

Features and functions of system 200 components are further discussed with reference to the example of FIG. 3.

Figure 3:
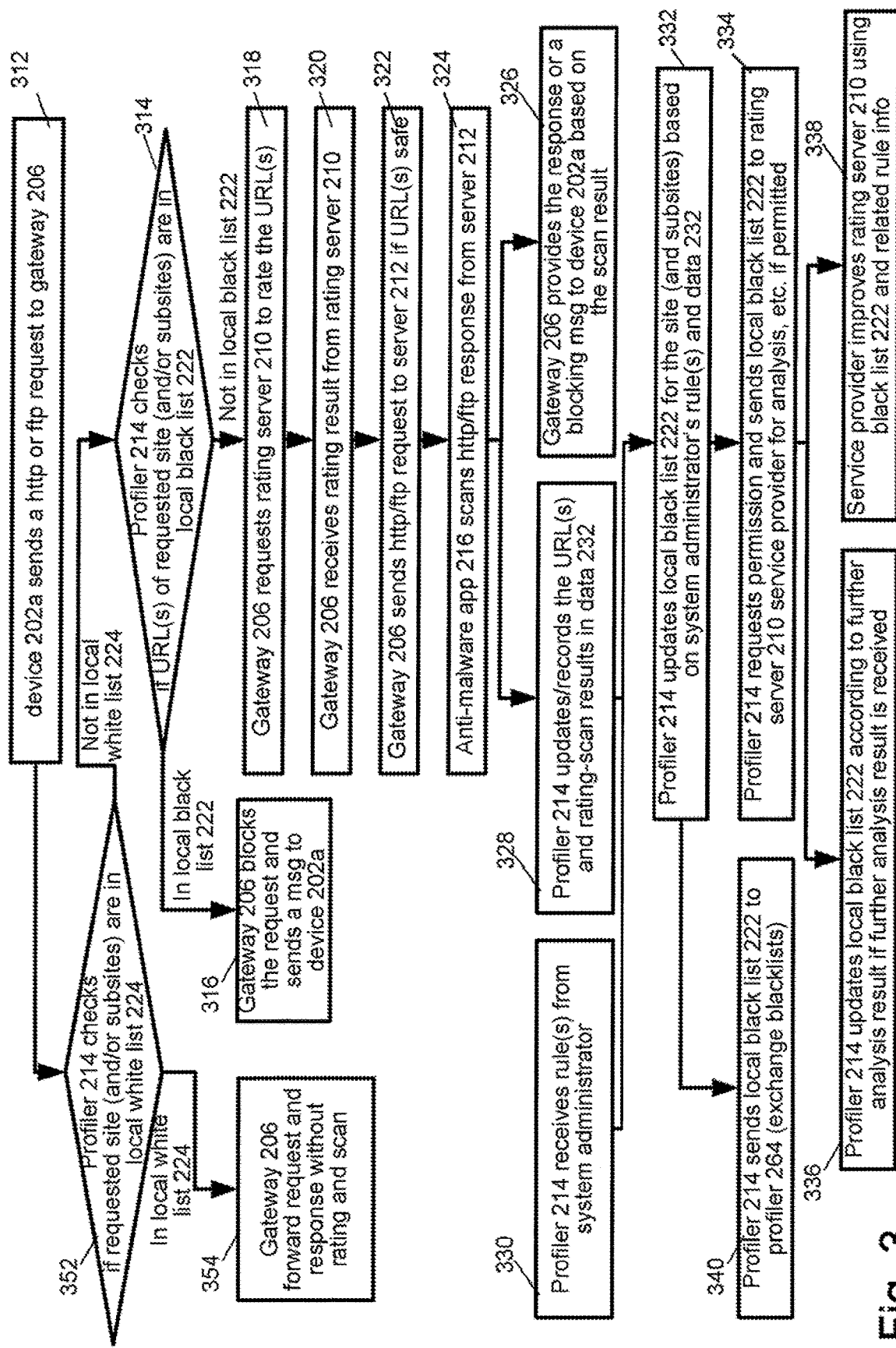
FIG. 3 illustrates a flowchart of a method for facilitating malicious site detection in accordance with one or more embodiments of the present invention.

FIG. 3 illustrates a flowchart of a method for facilitating malicious site detection in accordance with one or more embodiments of the invention. The method may be implemented, for example, utilizing system 200 illustrated in the example of FIG. 2. The method may start with step 312, in which a device, e.g., device 202a, may send a FTP request and/or a HTTP request to gateway 206.

In step 352, profiler 214 may check whether the URL(s) of the requested site (and/or related subsites) are in local white list 224. If the URL(s) are in local white list 224, control may be transferred to step 354. If the URL(s) are not in local white list 224 control may be transferred to step 314.

In step 354, gateway 206 may forward the HTTP/FTP request to server 212 without requesting rating to be performed by URL rating server 210 or any other rating server. In step 354, gateway 206 may also forward the HTTP/FTP response from server 212 to device 202a without data in the HTTP/FTP response being scanned by anti-malware application 216.

With local white list 224, unnecessary rating and scans may be eliminated. As a result, the burden on URL rating server 210 and anti-malware application 216 may be reduced, the responsiveness or the URL rating server 210 and anti-malware application 216 may be substantially improved, and the costs for implementing URL rating server 210 and anti-malware application 216 may be reduced.

In step 314, profiler 214 may check whether the URL(s) of the requested site (and/or the related subsites) are in local black list 222. If the URL(s) are in local black list 222, control may be transferred to step 316; if not, control may be transferred to step 318.

In step 316, gateway 206 may block the HTTP/FTP request or access attempt without requesting URL rating server 210 to perform rating. As a result, unnecessary rating may be further reduced, and the responsiveness of URL rating server 210 may be improved. In step 316, gateway 206 may also send a message to device 202a to inform the user that the access request/attempt has been blocked.

In step 318, gateway 206 may, through Internet 208, request URL rating server 210 to rate the URL(s). In step 320, gateway 206 may receive a rating result from URL rating server 210.

In step 322, gateway 206 may send the HTTP/FTP request to server 212 if the URLs(s) are determined to be safe according to the rating result. In step 322, gateway 206 may also block the HTTP/FTP request (or access attempt) if one or more of the URL(s) are determined to be malicious based on the rating result.

In step 324, anti-malware application 216 may scan data contained in the HTTP/FTP response provided by server 212 if gateway 206 has sent the HTTP/FTP request to server 212.

In step 326, based on the scan result, gateway 206 may provide the HTTP/FTP response to device 202a if the data contained in the response are determined to be safe. If the data contained in the response are determined to be malicious, anti-malware application 216 may perform an anti-malware action, e.g., removing or quarantining the data. Accordingly, gateway 206 may provide a message to device 202a to inform the user of the anti-malware action In step 328, profiler 214 may record and/or update the URL(s) and associated rating and/or scan results in result data 232.

In step 330, profiler 214 may receive one or more rules from a system administrator for configuring local black list 222. The rules may be determined based on site types, location or access activities, and local knowledge, for example, pertaining to particular languages utilized in web/FTP sites. The rules may include one or more thresholds for providing additional protection. For example, a rule may require that if a certain proportion or percentage, e.g., 20 percent, of URLs associated with a site (e.g. subsites) has been determined to be malicious, then the site should be included in local black list 222. As an example, if a site includes 100 subsites and if 25 of the subsites are determined to be malicious according to at least one of rating performed by URL rating server 210 and scans performed by anti-malware application 216, then the site is to be included in local black list 222. In one or embodiments, safe subsites of the site may still be included in local white list 224. The rules based on local knowledge may compensate deficiencies of URL rating server 210 and anti-malware application 216 and may facilitate malicious site detection and safe site access.

In step 332, profiler 214 may, if applicable, update local black list 222 for the requested site (and associated subsites) based on the system administrator's rules and the updated result data 232. With the additional threshold/protection provided by the rules based on local knowledge (and with the ranting-scanning results associated with local requests), local black list 222 may compensate the deficiency of URL rating server 210 caused by lack of global data samples for particular web/FTP sites.

In step 340, profiler 214 may send data in updated local black list 222 to profiler 264, for profiler 264 to update and improve local black list 272. Similarly, profiler 264 also may provide data in updated local black list 272 to profiler 214, for profiler 214 to improve local black list 222. As a result, the coverage and accuracy of the local black lists may be improved, and malicious site detection may be more efficient and effective.

LAN 204 and LAN 254 may represent, for example, different sites of an enterprise in different geographic regions. Through exchange of local black list data, local knowledge can be exchanged among multiple sites to improve overall Internet security.

In step 334, profiler 214 may request permission, for example, from the system administrator of LAN 204, for providing local black list 222 to the URL rating server 210 operator (or the rating service provider). If permitted, profiler 214 may provide local black list 222 to the URL rating server 210 operator for analysis, etc.

In step 338, the operator of URL rating server 210 may improve rating server 210 utilizing data and related rule information associated with local black list 222. Rating server 210 may also be improved utilizing information associated with other black lists, such as local black list 272, provided by other profilers on other LANs. Accordingly, URL rating server 210 may be augmented with additional sample data from various sources in various geographic locations.

In step 336 profiler may receive black list data analysis results from service provider of rating server 210. Accordingly, profiler 214 may further improve local black list 222 utilizing the analysis result.

As can be appreciated from the foregoing, embodiments of the invention may locally intercept potential access to malicious sites based on local black lists without waiting for rating result from remote rating servers, thereby substantially improving efficiency in providing Internet security.

With pre-filtering based on local black lists, embodiments of the invention may reduce the amount of rating requests and data requiring scan. Advantageously, costs for implementing rating servers and anti-malware mechanisms may be substantially reduced, the responsiveness of the rating servers and the anti-malware mechanisms may be improved, and the efficiency and effectiveness of malicious site detection may be improved.

With exchange of knowledge and feedback among LANs and rating server operators, and with rules configured (and customized) based on local knowledge, embodiments of the invention may effectively augment local black lists and rating servers. Advantageously, the efficiency and effectiveness of malicious site detection may be further improved.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including till such alterations, permutations, and equivalents as fall within the true spirit and scope of the present invention.

What is claimed is:

1. A method for facilitating malicious site detection, the method comprising:
   receiving, at a gateway, a request for data made by a device of a plurality of devices on a local area network (LAN) to a website on the Internet, wherein all communications between the plurality of devices on the LAN and websites on the Internet pass through the gateway on the LAN;
   checking, by the gateway, a local black list on the LAN to determine whether or not a uniform resource locator (URL) of the website is in the local black list, the local black list including URLs of malicious websites;
   requesting, by the gateway, a reputation rating server on the Internet to rate the URL of the website in response to the URL of the website not being in the local black list;
   blocking the request for data if a rating result from the reputation rating server indicates that the URL of the website is malicious;
   sending the request for data to the website if the rating result from the reputation rating server indicates that the URL of the website is safe;
   updating the local black list based at least on rating results received from the reputation rating server; and
   providing the local black list to the reputation rating server on the Internet.

2. The method of claim 1, wherein the request for data is a Hypertext Transfer Protocol (HTTP) request.

3. The method of claim 1, wherein the request for data is a File Transfer Protocol (FTP) request.

4. The method of claim 1, wherein updating the local black list includes adding another website in the local black list if a predetermined percentage of URLs associated with the another website are malicious according to the rating results received from the reputation rating server.

5. The method of claim 1, further comprising:
   after sending the request for data to the website in response to the rating result from the reputation rating server indicating that the URL of the website is safe, receiving a response data from the website;
   scanning the response data;
   detecting the response data to be malicious; and
   performing an anti-malware action on the response data.

6. The method of claim 2, wherein the anti-malware action includes quarantining the response data.

7. A gateway for facilitating malicious site detection, the gateway comprising a processor and a memory, the memory storing instructions that when executed by the processor cause the gateway to:
   receive a request for data made by a device of a plurality of devices on the LAN to a website on the Internet, wherein all communications between the plurality of devices on the LAN and websites on the Internet pass through the gateway;
   check a local black list on the LAN to determine whether or not a uniform resource locator (URL) of the web site is in the local black list, the local black list including URLs of malicious websites;
   request a reputation rating server on the Internet to rate the URL of the website in response to the URL of the website not being in the local black list;
   block the request for data if a rating result from the reputation rating server indicates that the URL of the website is malicious;
   send the request for data to the website if the rating result from the reputation rating server indicates that the URL of the website is safe;
   update the local black list based at least on rating results received from the reputation rating server; and
   provide the local black list to the reputation rating server.

8. The gateway of claim 7, wherein the request for data is a Hypertext Transfer Protocol (HTTP) request.

9. The gateway of claim 7, wherein the request for data is a File Transfer Protocol (FTP) request.

10. The gateway of claim 7, wherein the instructions, when executed by the processor, cause the gateway to update the local black list by adding another website in the local black list if a predetermined percentage of URLs associated with the another website are malicious according to the rating results received from the reputation rating server.

11. The gateway of claim 7, wherein the instructions, when executed by the processor, cause the gateway to:
   after sending the request for data to the website in response to the rating result from the reputation rating server indicating that the URL of the website is safe, receive a response data from the website;

scan the response data;
detect that the response data is malicious; and
perform an anti-malware action on the response data.

12. The gateway of claim 11, wherein the anti-malware action includes quarantining the response data.

\* \* \* \* \*